Feb. 23, 1932.  C. GOTTWALD  1,846,550
PIPE SUPPORT FOR USE WITH CONDUITS
Filed Aug. 12, 1927
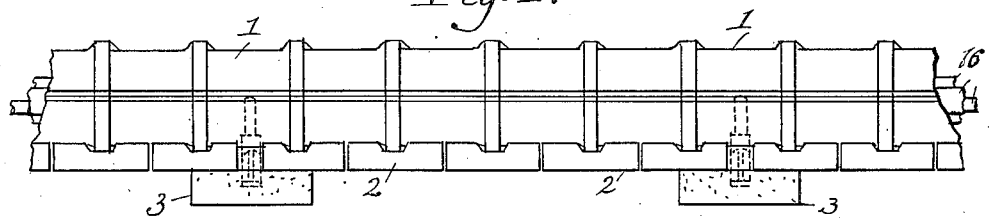
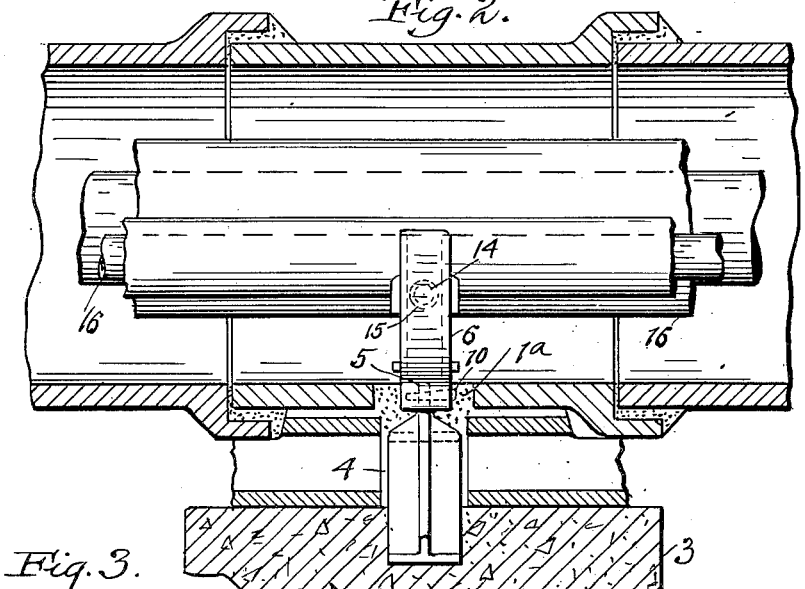
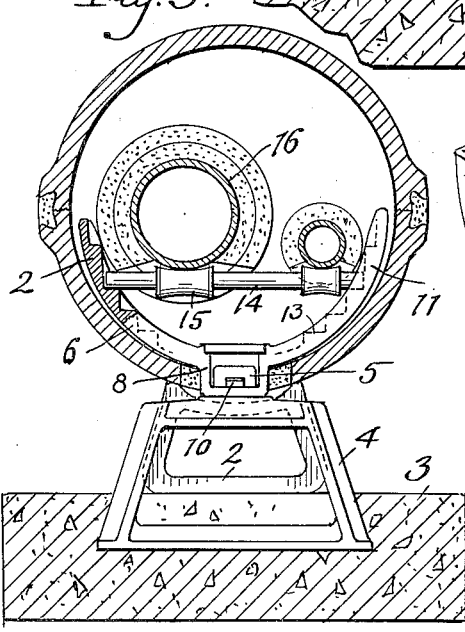
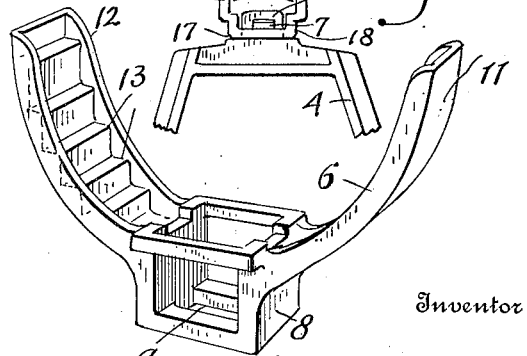
Inventor
Christian Gottwald Patented Feb. 23, 1932

1,846,550

UNITED STATES PATENT OFFICE

CHRISTIAN GOTTWALD, OF CLEVELAND, OHIO, ASSIGNOR TO THE RIC-WIL COMPANY, OF CLEVELAND, OHIO, A CORPORATION OF OHIO

PIPE SUPPORT FOR USE WITH CONDUITS

Application filed August 12, 1927. Serial No. 212,505.

The present invention relates to conduits which are adapted to house underground pipe, for instance steam pipes or perchance gas pipes.

The particular object of the present invention is to provide a construction for supporting pipe within the conduit, the devices of the present invention being located at predetermined distances apart and extending into the conduit in proper position to engage and support the pipe or pipes housed therein.

One of the objects is to provide a support for the conduit, which support is entirely independent of the conduit or the base drain which supports the conduit, whereby the weight of the pipe within the conduit is borne entirely by the support.

A further object of the invention is to provide a supporting device comprised of two parts, certain portions being interchangeable with respect to the base portions.

Still another object of the invention is to provide a supporting device in which the part which directly engages the pipe may be arranged at different heights with respect to the conduit.

Reference should be had to the accompanying drawings forming a part of this specification, in which, Figure 1 is an elevation of a part of a conduit showing the invention as employed with respect thereto.

Figure 2 is a sectional elevation of a portion of the conduit, showing one of the supporting devices.

Figure 3 is a transverse section through a conduit showing a supporting device.

Figure 4 is a perspective view showing a form of the upper portion of the supporting device.

Figure 5 is an elevation showing an interchangeable upper part for the supporting device.

In referring to the drawings the conduit sections are represented at 1, these being of the usual bell and spigot type, and the sections are supported on base-drains 2 which are so arranged with respect to each other and with respect to the conduit sections that water condensation or other water that may get within the conduit pipe line may be drained through the drain section.

At suitable intervals in a conduit line supporting devices are provided, which extend into the conduit proper and in position to support a pipe line or pipe lines housed within the conduit.

Each of the supporting devices comprises a footing 3, which is preferably made of concrete or some similar material, and in this footing 3 is mounted the base 4 of the supporting devices. This base comprises leg portions which are spread apart so as to form an opening to permit communication between the contiguous sections of the base-drain supports 2. As will be seen by reference to Figure 3, a portion of the base 4 extends above the footing 3 in which the base is embedded.

In the upper portion of the base there is an upstanding loop or eye 5, and cooperating with the loop or eye 5 is an upper supporting member, one form of which is indicated generally at 6 in Figure 4, and in alternative form at 7 in Figure 5.

Referring to the form shown in Figure 4, it comprises a central box-like portion 8, having a slot 9 in the lower portion thereof, which is adapted to cooperate with the upstanding loop or eye 5. The loop 5 extends above the slot 9, and when the parts mentioned are in engagement a wedge 10 may be inserted through the eye 5 and above the slot 9 so as to thereby securely fasten the upper portion of the support to the base.

Extending laterally from the central portion 8 are curved arms 11 and 12. These arms are provided with a series of steps 13, corresponding opposite steps of which are adapted to receive and support the ends of a cylindrical member 14, which cylindrical member carries a spool such as indicated at 15, which directly engages with a pipe or pipes 16 supported within the conduit sections.

As will be apparent, different lengths of cylindrical rollers or shafts 14 may be employed in order to accommodate different sizes of pipe.

The construction to which reference has just been made is preferably employed where there is more than one pipe to be mounted within a line of conduit. Such a construction providing for the support of at least two pipe lines.

The alternative form of structure which is shown in Figure 5 provides a portion 17 which is provided with a slot through which extends the eye 5 of the pipe portion to which reference has before been made. When the parts are assembled, as shown in Figure 5, a wedge 18 may be inserted through the loop 5, thus holding the member 7 firmly with respect to the base 4. The member 7 is provided with arms 19 which receive a shaft 20 on which is carried a roller 21. This roller will support a single pipe line within the conduit sections.

It will be apparent that where more than two pipe lines are to be supported within the conduit, a transverse member 14 may be arranged to engage with the upper steps of the arms 11 and 12, thus permitting a shorter roller to engage with lower steps, which shorter roller may support additional pipe line or pipe lines beneath the upper pipe lines.

In order to permit the supporting device to extend into the line or conduit, the particular conduit section into which the support extends is provided with a suitable opening, such as indicated at 1ª in Figure 2. These sections are otherwise the same as those uniformly used throughout the conduit construction.

In the foregoing construction it will be seen that the pipe line is supported entirely independent of the conduit itself, so that no undue strain is brought upon any portion of the conduit or of the base-drain members which support the conduit.

Having thus described my invention what I claim as new is,

1. In a conduit construction, a conduit, a drain below said conduit, a pipe supporting device extending into said conduit, and a rigid base for said pipe supporting device extending downwardly below the level of said drain and having an aperture aligned with said drain.

2. In a conduit construction, a conduit, a drain below said conduit, a pipe supporting device extending into said conduit, and a base for said pipe supporting device having leg portions extending downwardly below the level of said drain and located outside of said drain.

3. In a conduit construction, a conduit, a drain below said conduit upon which the conduit is supported, pipe supporting devices extending into said conduit, a footing below the level of said drain, and means associated with said pipe supporting devices for supporting the same from said footing without substantially obstructing said drain.

4. In a conduit construction, a conduit, a drain having a passage below said conduit, pipe supporting devices extending into said conduit, a footing below the level of said drain, a rigid base for said pipe supporting devices engaging said footing, and means within said base for continuing the passage of said drain through said base.

5. In a conduit construction, a conduit, a drain below said conduit, pipe supporting devices extending into said conduit, a footing below the level of said drain, and rigid bases for said pipe supporting devices extending downwardly on both sides of said drain and into said footing.

6. In a conduit construction, a plurality of conduit sections arranged end to end in longitudinal alignment to form a conduit, a drain below said conduit comprising a plurality of drain sections also arranged end to end in longitudinal alignment, pipe supporting devices extending into said conduit and having preformed rigid bases provided with apertures in substantial alignment with the bore of the drain sections.

7. In a conduit construction, a plurality of conduit sections arranged end to end in longitudinal alignment to form a conduit, a drain directly below and supporting said conduit sections formed by a plurality of drain sections also arranged end to end in longitudinal alignment, the lower side of certain of said conduit sections being constructed to provide apertures, and pipe supporting devices extending through said apertures into said conduit, said pipe supporting devices having preformed rigid bases with leg portions located outside of the passage of said drain and straddling the space between adjacent drain sections that is formed by a longitudinal projection of the sections.

8. A preformed pipe supporting device for use with conduit, comprising a base portion, an upper portion secured to the base portion, said upper portion comprising oppositely extending arms adapted to lie adjacent the inner periphery of the conduit, a plurality of notches carried by each of said arms, a transversely extending cylindrical member cooperating with oppositely disposed notches, and means carried by the cylindrical member for cooperating with a pipe.

9. A preformed pipe supporting device for use with conduit, comprising a base portion, an upper portion carried by the base portion, said upper portion being provided with oppositely disposed arms adapted to substantially follow the inner contour of the conduit, and having stepped bearing surfaces adapted to removably receive pipe supporting members of various lengths.

In testimony whereof, I hereunto affix my signature.

CHRISTIAN GOTTWALD.

DISCLAIMER 1,846,550.—*Christian Gottwald*, Cleveland, Ohio. PIPE SUPPORT FOR USE WITH CONDUITS. Patent dated February 23, 1932. Disclaimer filed April 18, 1940, by the assignee, *The Ric-Wil Company*, and the inventor.

Hereby disclaim from claims 8 and 9 any pipe supporting device in which the base of the support does not project beyond the conduit, together with its base drain, to receive its support beyond the limits of these elements.

[*Official Gazette May 14, 1940.*]